R. M. PANCOAST.
CORN SLITTER AND SCRAPER.
APPLICATION FILED AUG. 4, 1910.
983,515.
Patented Feb. 7, 1911.
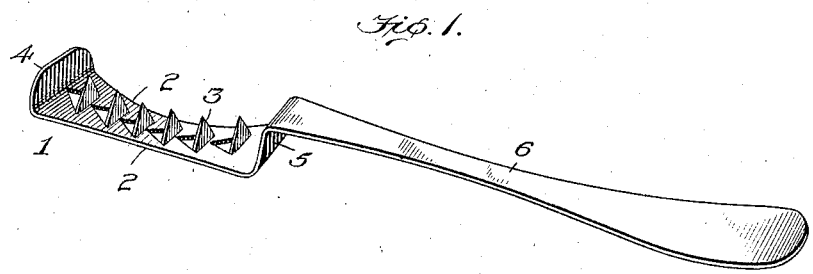
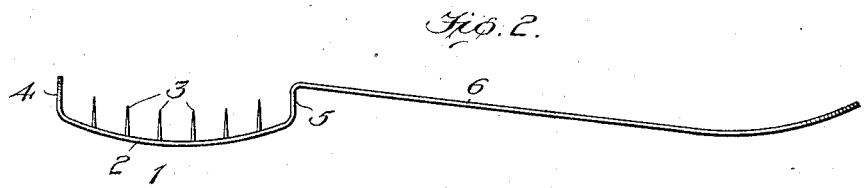
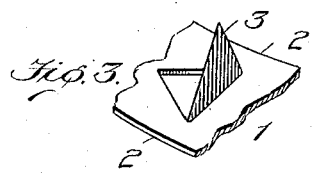
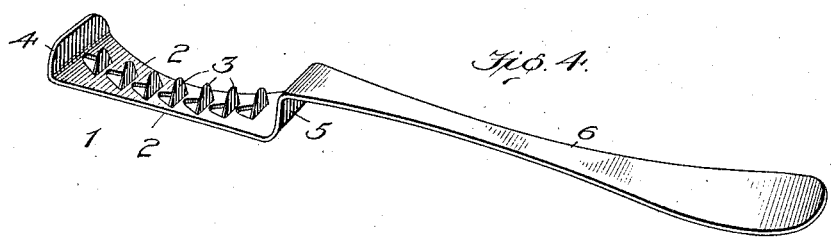
Witnesses
Edwin L. Bradford
Ralph Wormelle
Inventor
R. M. Pancoast,
By F. E. Stebbins
Attorney

UNITED STATES PATENT OFFICE.

RICHARD M. PANCOAST, OF CAMDEN, NEW JERSEY, ASSIGNOR TO LAURA T. PANCOAST, OF CAMDEN, NEW JERSEY.

CORN SLITTER AND SCRAPER.

983,515.   Specification of Letters Patent.   Patented Feb. 7, 1911.

Application filed August 4, 1910. Serial No. 575,546.

*To all whom it may concern:*

Be it known that I, RICHARD M. PANCOAST, a citizen of the United States, residing at Camden, in the county of Camden and State of New Jersey, have invented certain new and useful Improvements in Corn Slitters and Scrapers, of which the following is a specification.

The object of my invention is the production of a simple, cheap and efficient implement or means for slitting grains of green corn while on the ear and also for removing the kernels, when so desired, after the grains have been slit.

The invention consists in an implement for the purpose specified having certain novelties of construction and formation, as hereinafter set forth and claimed.

The accompanying drawing illustrates two examples of the physical embodiment of the invention constructed according to the best modes of procedure I have so far devised.

Figure 1 is a view in perspective of the first example. Fig. 2 is a side or edge view of the same. Fig. 3 is a view in perspective and on an enlarged scale of one of the teeth. Fig. 4 is a view in perspective of the second example. Fig. 5 is a side or edge view thereof. Fig. 6 is an enlarged view in perspective of one of the teeth.

Each example of the slitter and scraper may be made from sheet metal by cutting out suitably shaped blanks, pressing or stamping the blanks to the required shapes, and then finishing the same; or each may be fashioned in any other way, as by casting.

Referring to both the examples, the numeral 1 designates the body of the implement slightly concavo-convex longitudinally, with at least one of its side edges 2, 2, slightly concave in shape, and provided with integral teeth 3 struck up from the concave surface of the body of the metal so as to project substantially in parallel planes from the concave surface. The teeth are uniformly spaced apart and sufficiently near together as to insure that one tooth at least will engage each grain of a row of grains when the implement is moved longitudinally along an ear of corn. It will be noted that the points or ends of the series of teeth lie in a curved line which in a measure conforms to a part of the external curvature of the surface of an ear of corn, whereby the grains in the rows each side of a central row will be slit to the proper depth as well as the grains of the central row of grains.

The teeth in the first example, Figs. 1, 2 and 3, are six in number, each triangular in shape and having a point, and with the side edges thereof sharpened, in any suitable way, to provide cutting edges, as shown by Fig. 3. As the points of these teeth sometimes cause the very soft or immature watery grains to splash while being slit, the sudden breaking into such grains by the points causing the splash, I have provided a form of tooth shown by the second example, Figs. 4, 5 and 6, whereby this objectionable occurrence is obviated. In this second example the teeth are of the same size, but rounded at the ends, so that in use they give a shearing cut when they pass through the outer covering into the kernels. By rounding off the tips of the teeth and making them one-sixth less in height than the pointed teeth, one more tooth can be cut and struck up from the body of the metal when of the same length of body as shown in the second example. The second and preferable form of the implement as shown by Figs. 4, 5 and 6 thus has seven teeth.

At the ends of the series of teeth and projecting beyond the same are flanges 4 and 5 which serve the double purpose of guiding the implement on the ear of corn when in use and very materially protecting the teeth from becoming nicked or dulled by contact with other utensils or with themselves when being washed and handled off the table.

One of the side edges 2, 2 of the body, as before stated, is preferably concave, or cut away on a curved line, whereby the implement is guided and held in position when the edge is used in scraping the slit grains to remove the kernels from the ear.

At one end of the body of the implement a handle 6 is provided, the same extending from the upper edge of the flange 5 and substantially in the same direction as the length of the body portion. This handle may be two and a half times the length of the body portion and curved one-fourth of its length, as shown; or it may be otherwise shaped.

In use the implement is moved in either direction longitudinally of an ear of corn with the teeth engaging the grains. When the grains have been slit the implement is turned at right angles to its previous position and a concave edge 2 brought in contact with the slit grains and the kernels thus removed or scraped from the ear.

While I have referred to the implement as made of sheet metal, it may, when desired, be made by casting the same to the desired shape, the body, flanges, teeth and handle preferably being integrally fashioned.

What I claim is:

1. An integral metallic slitter comprising a concavo convex body portion, a series of teeth struck from the metal and turned up so as to project from the concave surface of the body portion, a flange at each end of the series of teeth, and a handle extending from the edge of one of said flanges and in a direction substantially at right angles to the parallel planes of the teeth and flanges.

2. An integral metallic slitter comprising a body portion of concavo-convex shape longitudinally and narrower at the central portion than at its ends, a series of teeth with rounded edges struck from the metal and turned up so as to project from the concave surface of the body portion, flanges one at each end of said body portion, and a handle extended in a direction substantially at right angles to the substantially parallel flanges.

In testimony whereof I affix my signature in presence of two witnesses.

RICHARD M. PANCOAST.

Witnesses:
R. M. PANCOAST, Jr.,
L. T. PANCOAST.